United States Patent
Lin et al.

(10) Patent No.: US 9,812,876 B2
(45) Date of Patent: Nov. 7, 2017

(54) WALL SOCKET WITH LOAD DETECTING CIRCUIT

(71) Applicant: DELTA ELECTRONICS, INC., Taoyuan (TW)

(72) Inventors: Kun-Chi Lin, Taoyuan (TW); Chung-Chieh Cheng, Taoyuan (TW); Chun-Chih Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/000,049

(22) Filed: Jan. 19, 2016

(65) Prior Publication Data
US 2016/0372964 A1    Dec. 22, 2016

(30) Foreign Application Priority Data
Jun. 18, 2015    (TW) .............................. 104119678 A

(51) Int. Cl.
*H02M 3/335* (2006.01)
*H02J 7/00* (2006.01)
(Continued)

(52) U.S. Cl.
CPC ....... *H02J 7/0004* (2013.01); *H02M 3/33523* (2013.01); *H01R 13/6675* (2013.01); *H01R 13/703* (2013.01); *H01R 24/76* (2013.01); *H02J 7/0042* (2013.01); *H02J 2007/0062* (2013.01); *H02J 2007/0096* (2013.01); *H02M 1/36* (2013.01)

(58) Field of Classification Search
CPC . H02M 2001/0003; H02M 2001/0025; H02M 3/33507; H02M 3/33523; H02M 3/33538; H02M 3/33546; H02M 3/33553; H02J 7/022; H02J 7/04; H02J 7/042; H02J 7/045; H01R 24/76; H01R 24/78
USPC ...... 363/13, 15, 16, 20, 21.01, 21.04, 21.06, 363/21.07, 21.09, 21.12, 21.14, 21.15, 363/21.17
See application file for complete search history.

(56) References Cited

U.S. PATENT DOCUMENTS 6,266,261 B1 *   7/2001   Lanni .................... H02J 7/0008
                                                          363/144
7,973,515 B2     7/2011   Densham et al.
(Continued)

FOREIGN PATENT DOCUMENTS

| CN | 103208850 A | 7/2013 |
| CN | 203691030 U | 7/2014 |
| TW | I413894 B | 11/2013 |

*Primary Examiner* — Jeffrey Gblende
*Assistant Examiner* — David A. Singh
(74) *Attorney, Agent, or Firm* — CKC & Partners Co., Ltd.

(57) ABSTRACT

A wall socket includes a socket housing, an output terminal, a power converter circuit and a load detection circuit. The output terminal is arranged at a side of the socket housing and configured to output a DC output voltage. The power converter circuit is arranged in the socket housing and configured to convert an input voltage to the DC output voltage according to a control signal. The load detection circuit is configured to receive an identification signal outputted by an electronic device when the electronic device is connected to the output terminal, and output the control signal according to the identification signal to adjust a voltage level of the DC output voltage.

20 Claims, 5 Drawing Sheets

(51) Int. Cl.
 *H02M 1/36* (2007.01)
 *H01R 13/66* (2006.01)
 *H01R 13/703* (2006.01)
 *H01R 24/76* (2011.01)

(56) References Cited

U.S. PATENT DOCUMENTS

| | | |
|---|---|---|
| 8,531,060 B2 | 9/2013 | Chang et al. |
| 2002/0043942 A1* | 4/2002 | Hua ................. H01R 31/065 315/276 |
| 2008/0231121 A1* | 9/2008 | Yang ................ H01R 13/6658 307/131 |
| 2010/0164301 A1 | 7/2010 | Chang et al. |
| 2011/0194315 A1* | 8/2011 | Gaknoki ........... H02M 3/33507 363/21.17 |
| 2012/0250366 A1* | 10/2012 | Wang ................ H02M 3/33523 363/21.15 |
| 2013/0038275 A1* | 2/2013 | Chen ................. H02J 7/0055 320/107 |
| 2013/0049622 A1* | 2/2013 | Angeles ............ H05B 33/0848 315/224 |
| 2014/0028211 A1* | 1/2014 | Imam ............... H02M 3/33507 315/200 R |
| 2014/0098571 A1* | 4/2014 | Gaknoki ................ H02M 1/40 363/16 |
| 2014/0240966 A1* | 8/2014 | Garcia ................. H02J 7/0086 362/183 |
| 2014/0321167 A1* | 10/2014 | Klein ............... H02M 3/33507 363/16 |

* cited by examiner

WALL SOCKET WITH LOAD DETECTING CIRCUIT

RELATED APPLICATIONS

This application claims priority to Taiwan Application Serial Number 104119678, filed Jun. 18, 2015, which is herein incorporated by reference.

BACKGROUND

Technical Field

The present disclosure relates to a wall socket, and in particular, to a wall socket with multiple output modes.

Description of Related Art

With the recent growing popularity of the mobile electronic devices such as smart phones and tablets, it has become an important topic in the field to satisfy the charging requirements of the mobile electronic devices. In various charging devices, a wall socket using Universal Serial Bus (USB) now plays an important role in power supply.

However, the USB wall socket only provides a fixed output voltage, which is insufficient to satisfy the various charging requirements of a large types of smart phones and tablets nowadays. Furthermore, the fixed power consumption of the USB wall socket steadily consumes power during the standby state which causes unnecessary energy loss.

SUMMARY

To solve the problem stated above, one aspect of the present disclosure is a wall socket. The wall socket includes a socket housing, an output terminal, a power converting circuit, and a load detecting circuit. The output terminal is arranged at a side of the socket housing and configured to output a dc output voltage. The power converting circuit is arranged in the socket housing and configured to convert an input voltage to the dc output voltage according to a control signal. The load detecting circuit is configured to receive an identification signal outputted by an electronic device when the electronic device is connected to the output terminal, and output the control signal according to the identification signal to adjust a voltage level of the dc output voltage.

Another aspect of the present invention is a wall socket. The wall socket includes an input terminal, an output terminal, a rectifier and filter circuit, a transformer, a load detecting circuit, a driving circuit, and a switch. The rectifier and filter circuit is electrically coupled to the input terminal and configured to convert an input voltage to a rectified voltage signal. The transformer includes a primary side electrically coupled to the rectifier and filter circuit, and a secondary side electrically coupled to the output terminal and configured to output a dc output voltage according to the rectified voltage signal. The load detecting circuit is electrically coupled to the output terminal and configured to receive an identification signal outputted by an electronic device when the electronic device is connected to the output terminal, and output a control signal according to the identification signal. The driving circuit is electrically coupled to the load detecting circuit and configured to receive the control signal and output a driving signal according to the control signal. The switch is electrically coupled to the primary side of the transformer and the driving circuit and configured to be turned on or off selectively according to the driving signal such that the voltage level of the dc output voltage outputted by the transformer corresponds to the driving signal.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
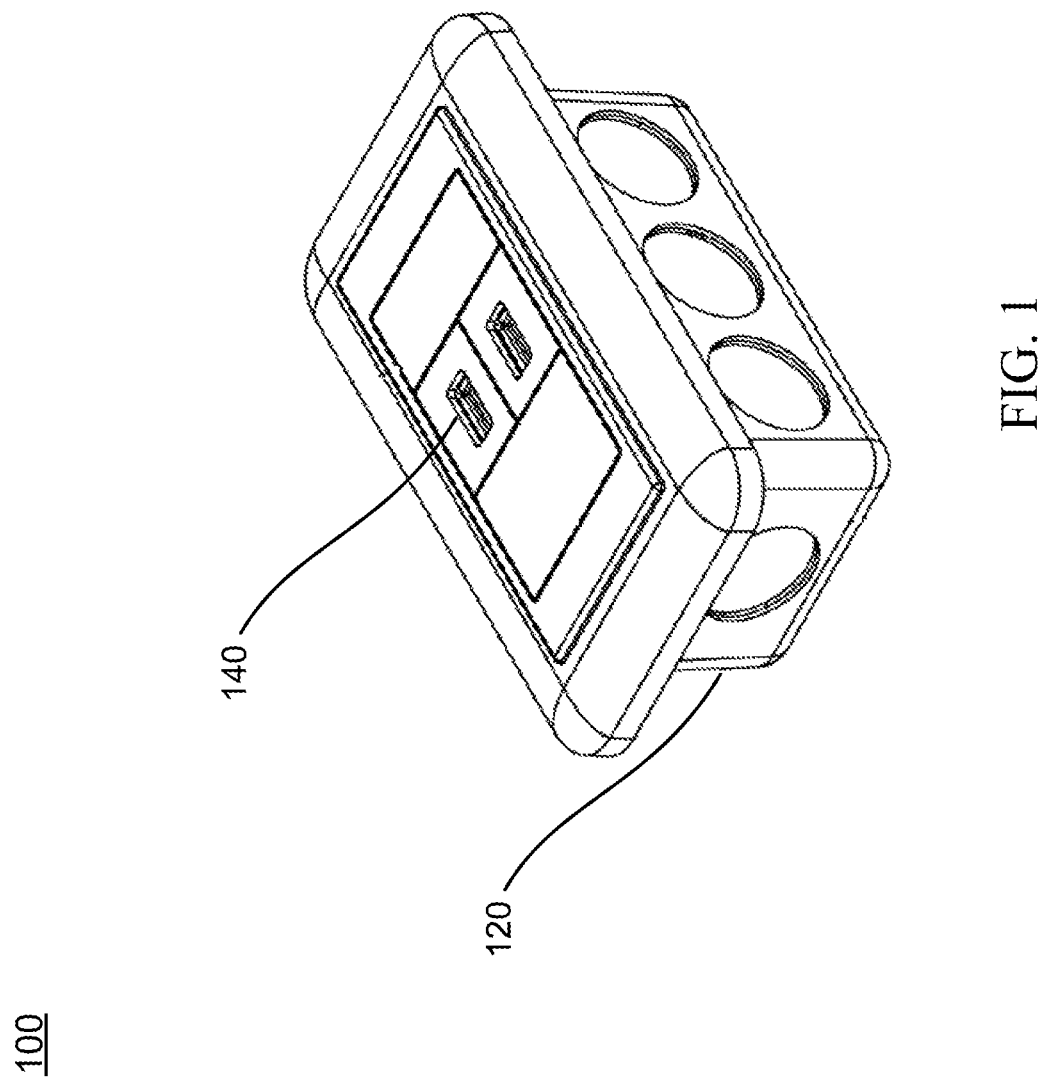
FIG. 1 is a diagram illustrating a wall socket according to an embodiment of the preset disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

The terms "about" and "approximately" in the disclosure are used as equivalents. Any numerals used in this disclosure with or without "about," "approximately," etc. are meant to cover any normal fluctuations appreciated by one of ordinary skill in the relevant art. In certain embodiments, the term "approximately" or "about" refers to a range of values that fall within 20%, 10%, 5%, or less in either direction (greater or less than) of the stated reference value unless otherwise stated or otherwise evident from the context.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a diagram illustrating a wall socket 100 according to an embodiment of the preset disclosure. In the present embodiment, the wall socket 100 includes a socket housing 120, at least one output terminal 140 and an input terminal (not shown). The wall socket 100 may be installed in the wall and receive an input voltage (e.g., 110V or 220V AC signal) from the power grid via the input terminal, and convert the input voltage to a DC output voltage having proper voltage level by a power converting circuit arranged in the socket housing 120.

It is noted that in some embodiments, the input voltage may be the AC voltage receive from the power grid, but the present disclosure is no limited thereto. In some embodiments, the input voltage may also be a DC voltage.

In the present embodiment, an output terminal 140 is arranged at a side of the socket housing 120, and configured to output the dc output voltage so as to supply power to an electronic device. As illustratively shown in FIG. 1, in some embodiments, the wall socket 100 may further include multiple output terminals 140 so as to supply power to multiple electronic devices.

Specifically, the output terminal 140 may be Universal Serial Bus (USB) interface, and the DC output voltage is outputted via an output pin (e.g., the Vbus pin) on the Universal Serial Bus. An identification signal outputted by the electronic device is received via an identification pin (e.g., D+ and D− pins of the USB 2.0, SSRX and SSTX pins of the USB 3.0, CC1 and CC2 pins of the USB 3.1 type-C, etc.) Thus, the wall socket 100 is able to provide corresponding DC output voltage according to different types and various needs of the electronic devices. For example, the voltage level of the DC output voltage may be configured to any possible value between 0 volts to 50 volts.

Figure 2:
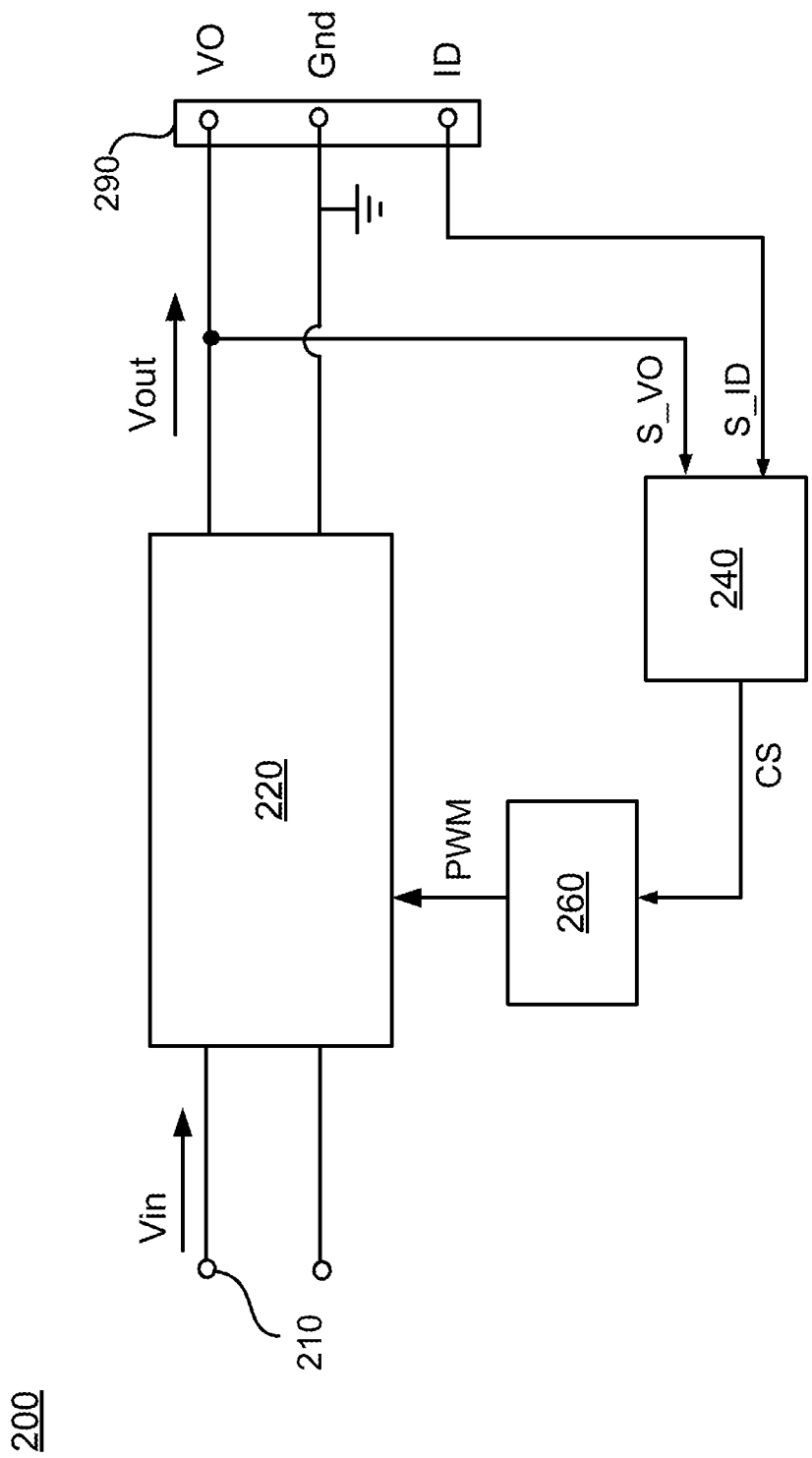
FIG. 2 is a circuit diagram illustrating the circuit of the wall socket according to an embodiment of the present disclosure.

The specific operation method of the wall socket 100 adjusting the DC output voltage according to the identification signal outputted by the electronic device will be described in accompanying with FIG. 2. FIG. 2 is a circuit diagram illustrating the circuit of the wall socket 200 according to an embodiment of the present disclosure.

As shown in FIG. 2, in the present embodiment the wall socket 200 includes an input terminal 210, a power converting circuit 220, a load detecting circuit 240, a driving circuit 260 and an output terminal 290. The output terminal 290 includes an output pin VO, a ground pin Gnd and an identification pin ID. The power converting circuit 220 is electrically coupled between the input terminal 210 and the output terminal 290. The load detecting circuit 240 is electrically coupled to the output terminal 290. The driving circuit 260 is electrically coupled between the power converting circuit 220 and the load detecting circuit 240.

The input terminal is configured to receive the input voltage Vin (e.g., the 110V or 220V AC signal) from the power grid. The output terminal 290 is configured to output the DC output voltage Vout.

The power converting circuit 220 is configured to convert the input voltage Vin to the DC output voltage Vout according to the control signal CS. Specifically, the power converting circuit 220 may be implemented by various types of the isolated high-frequency power converter circuit, such as Fly-back converter, Forward converter, etc.

The load detecting circuit 240 is configured to receive the identification signal S_ID outputted by the electronic device when the external electronic device is connected to the output terminal 290, and output the control signal CS according to the identification signal S_ID to adjust the voltage level of the DC output voltage Vout. In the present embodiments, the identification signal S_ID may be received via the identification pin ID of the output terminal 290.

The control signal CS outputted by the load detecting circuit 240 is received by the driving circuit 260. The driving circuit 260 may output a driving signal PWM according to the control signal CS after receiving the control signal CS. The power converting circuit 220 receives the driving signal PWM and then converts the input voltage Vin to the DC output voltage Vout with the proper voltage level according to the driving signal PWM. In some embodiments, the driving signal PWM may be a pulse width modulation signal.

It is noted that in some embodiment, the load detecting circuit 240 may further configured to receive a detecting signal S_VO which is corresponding to the DC output voltage Vout via a voltage detecting element, so as to determine whether the DC output voltage Vout is at the targeted voltage level and perform corresponding control.

The load detecting circuit 240 and the driving circuit 260 may be implemented by digital or analog circuits, and may also be implemented by various integrated circuits (ICs). One skilled in the art may choose the specific approach to implement the load detecting circuit 240 and the driving circuit 260 according to actual needs.

Figure 3:
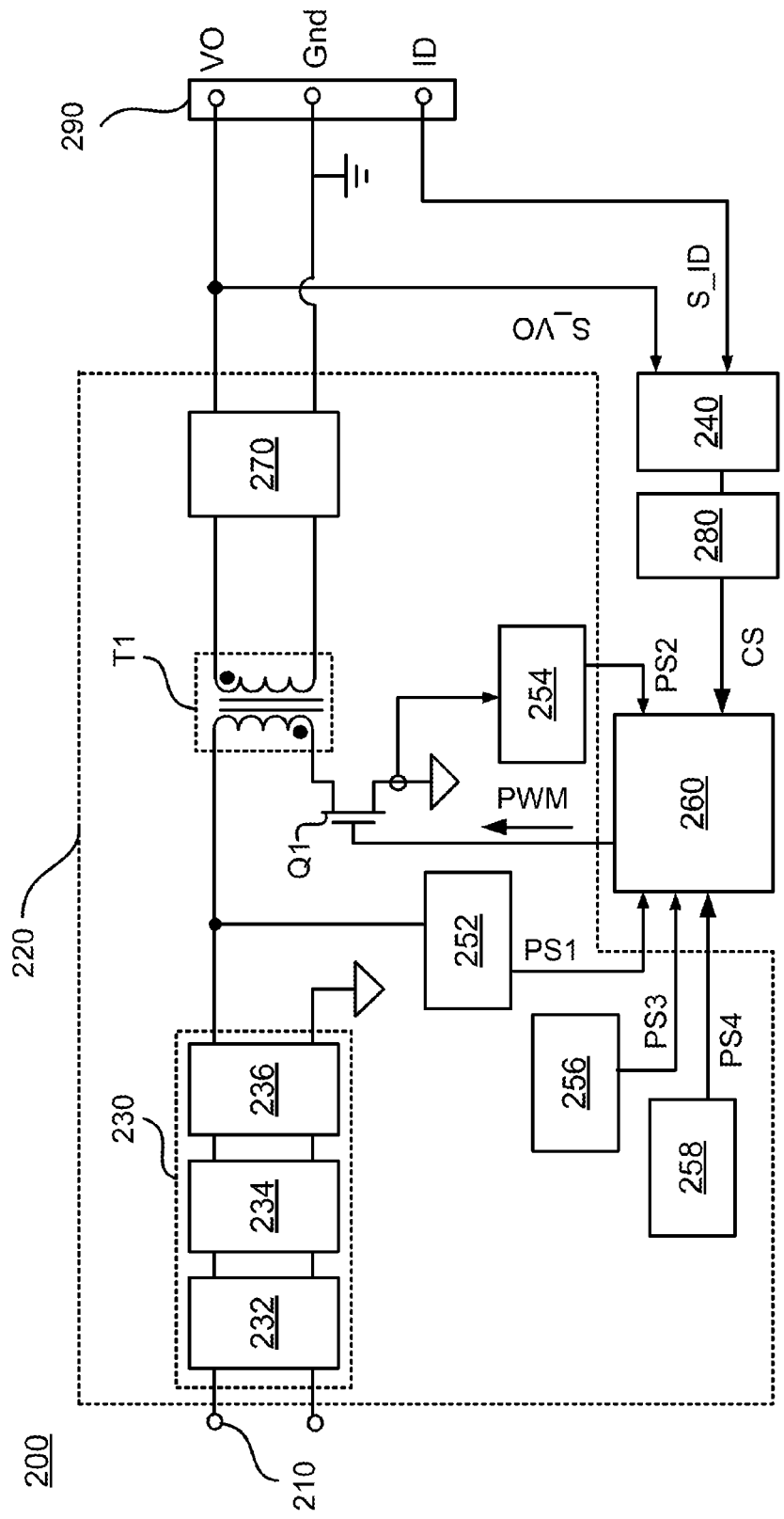
FIG. 3 is a circuit diagram illustrating the circuit of the wall socket according an embodiment of the present disclosure.

Reference is made to FIG. 3. FIG. 3 is a circuit diagram illustrating the circuit of the wall socket 200 according an embodiment of the present disclosure. As illustratively shown in FIG. 3, the power converting circuit 220 includes transformer T1, a switch Q1, Rectifier and filter circuits 230 and 270. The rectifier and filter circuit 230 is electrically coupled between the input terminal 210 and the primary side of the transformer T1. A first terminal of the switch Q1 is electrically coupled to the primary side of the transformer T1, a second terminal of the switch Q1 is electrically coupled to a ground terminal of the high voltage side, and a control terminal of the switch Q1 is electrically coupled to the driving circuit 260. The rectifier and filter circuit 270 is electrically coupled between the output terminal 290 and the secondary side of the transformer T1.

In the present embodiment, the rectifier and filter circuit is configured to convert the input voltage Vin to a rectified voltage signal V1. For example, the rectifier and filter circuit may include an over-voltage protection element 232, an electromagnetic interference filter (EMI filter) 234 and a rectifying unit 236. The over-voltage protection element 232 (e.g., a fuse) may disconnect the input terminal 210 and the transformer T1 when the input current exceeds a safe upper limit due to accidents, such as the system error or the device malfunction, so as to prevent the broken of the electronic elements in the wall socket 200. The electromagnetic interference filter 234 may be configured to filter out the high frequency noises in the input voltage. Then, the input voltage Vin without high frequency noises may be converted to the rectified voltage signal V1 by the rectifying unit 236. In some embodiments, the rectifying unit 236 may be implemented by rectifier elements such as bridge rectifiers.

The control terminal of the switch Q1 receives the driving signal PWM from the driving circuit 260 such that the switch Q1 is configured to be turned on or off selectively according to the driving signal PWM so as to adjust the rectified voltage signal V1 at the primary side of the transformer T1. For example, the driving circuit 260 may control the rectified voltage signal V1 at the primary side of the transformer T1 by adjusting the duty cycle of the pulse width modulation signal. Thus, the driving circuit 260 may indirectly control the DC output voltage Vout outputted from the secondary side of the transformer T1 such that the voltage level of the DC output voltage Vout outputted by the transformer T1 corresponds to the driving signal PWM.

Alternatively stated, when the electronic device is connected to the output terminal 290, the load detecting circuit 240 receives the identification signal S_ID sent by the electronic device via the identification pin ID of the output terminal 290, determines the type of the electronic device or the DC output voltage Vout required by the electronic device, and accordingly outputs corresponding control signal CS. The driving circuit 260 outputs corresponding driving signal PWM according to the control signal CS, and by adjusting the driving signal PWM having different duty cycle to control the on and off of the switch Q1, so as to adjust the voltage level of the DC output voltage Vout. For example, the driving circuit 260 may increase the duty cycle of the driving signal PWM to increase the voltage level of the DC output voltage Vout, or lower the duty cycle of the driving signal PWM so as to lower the voltage level of the DC output voltage Vout. According to the identification signal S_ID received by the identification pin ID, the voltage level of the DC output voltage Vout may be configured to 0V, 5V, 10V, 12V, 15V, 30V, 40V, 50V, etc. In some embodiments, the voltage level of the DC output voltage may be configured to any possible value between 0 volts to 50 volts.

Thus, the wall socket 100 may be configured to provide dynamic output voltage and with multiple power supply mode to automatically adjust the output to meet the requirement of the different loads, and thus improve the convenience for using.

In some embodiments, the rectifier and filter circuit 270 may perform rectifying and filtering to the DC voltage output Vout outputted by the transformer T1, such that the DC voltage output Vout received by the electronic device via the output terminal 290 satisfied the requirement and the regulation. One skilled in the art can understand how to implement the rectifier and filter circuit 270 with electronic elements such as capacitors and inductors, and thus further explanations are omitted for the sake of brevity.

It is noted that in some embodiments, the power converting circuit 200 may further include various protection modules, such as the over-voltage protection module 252, over-current protection module 254, over-power protection module 256, and over temperature protection module 258 as illustratively shown in FIG. 3. The circuit protection modules 252-258 may be outputs corresponding protection signal PS1-PS4 to the driving circuit 260 when detecting malfunction of the system, such that the driving circuit 260 stop outputting driving signal PWM to terminate the operation of the power converting circuit 220. It is noted that the circuit protection modules may be implemented by various types of the digital or analog circuits respectively, and may be implemented by different integrated circuit chips or integrated in a single integrated circuit chip.

In addition, the protection modules illustratively shown in the figures are only by examples and not meant to limit the present disclosure. For example, the over-voltage protection module 252, over-current protection module 254, over-power protection module 256, and over temperature protection module 258 shown in FIG. 3 are arranged at the high voltage side of the power converting circuit 220, but the protection modules may also be arranged at the low voltage side according to the actual needs. The power converting circuit 220 may also includes short-protection module and other circuit protection modules known by one skilled in the art.

In addition, in order to properly achieve isolation of the high voltage side and the low voltage side of the transformer T1, the wall socket 200 in the present disclosure further includes an isolating circuit 280. The isolating circuit 280 is electrically coupled between the load detecting circuit 240 and the driving circuit 260. The load detecting circuit 260 may be configured to output the control signal CS to the driving circuit 260 via the isolating circuit 280 to prevent the signal disturbance between the high voltage side and the low voltage side. For example, the isolating circuit 280 may include an opto-isolator (or optical coupler) element to achieve the electrical isolation.

In some embodiments of the present disclosure, the load detecting circuit 240 is not only configured to adjust the DC output voltage Vout, but also configured to output the control signal CS according to a shutdown signal when the external electronic device sends the shutdown signal, such that the power converting circuit 220 stops supplying power to the electronic device.

For example, when the external electronic device such as a tablet or a Smartphone is about to finish the charging, it may output the shutdown signal to the identification pin ID of the output terminal 290. When receiving the shutdown signal, the load detecting circuit 240 is configured to output corresponding control signal CS to control the driving circuit 260 to stop outputting driving signal PWM so as to terminate the operation of the power converting circuit 220. Thus, the power converting circuit 220 stops outputting the DC output voltage Vout. Therefore, the extra power consumption of the power converting circuit 220 and the driving circuit 260 generated by the operation under the standby state is avoided, and energy conservation is achieved by lowering the unnecessary power consumption.

Figure 4B:
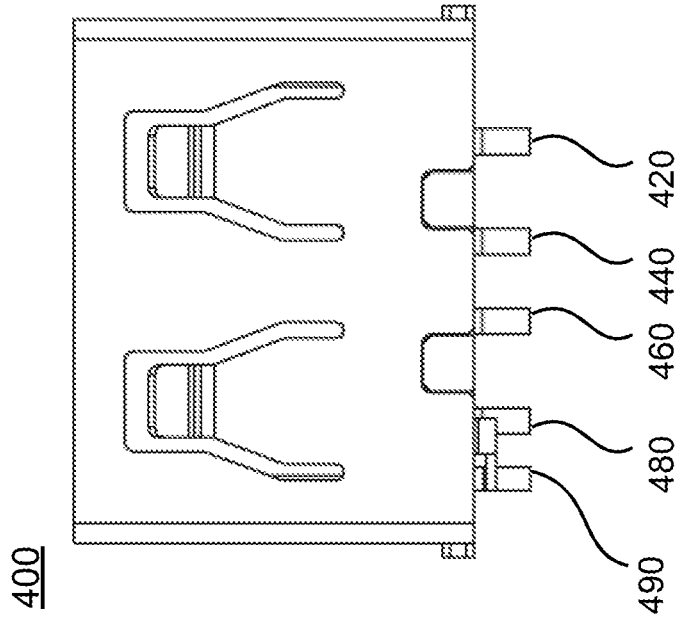
FIG. 4A and FIG. 4B are diagrams illustrating the output terminal according to an embodiment of the present disclosure.
Figure 4A:
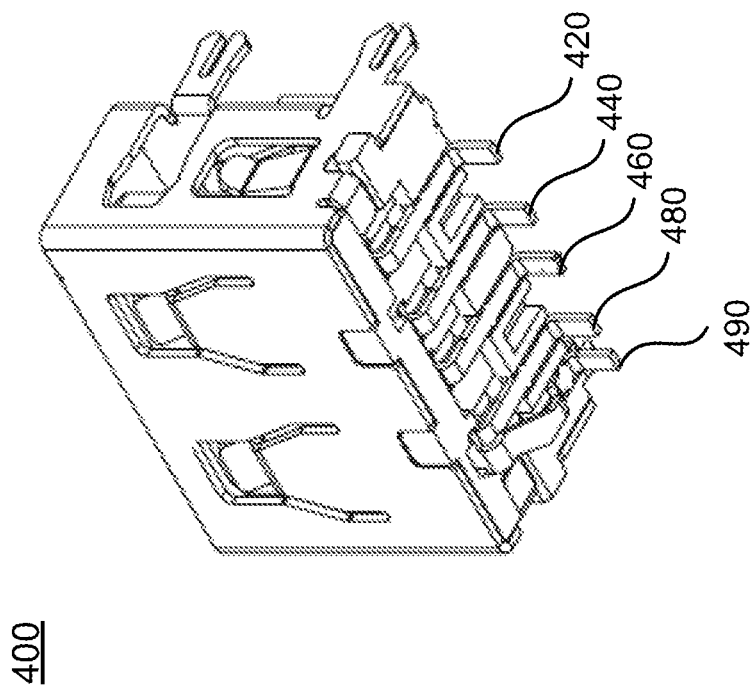

In some embodiments, the activating and the terminating operation of the power converting circuit 220 may be determined by a mechanic device. Reference is made to FIG. 4A and FIG. 4B. FIG. 4A and FIG. 4B are diagrams illustrating the output terminal 400 according to an embodiment of the present disclosure. For better understanding, FIG. 4A and FIG. 4B will be discussed in accompany with the embodiments of the FIG. 2 and FIG. 3, but the present disclosure is not limited thereto.

As illustratively shown in the figure, in the present embodiment, the output terminal 400 is a USB interface including the output pin (Vbus) 420, the D− pin 440, the D+ pin 460 and the ground pin 480. The output pin 420 is configured to output the DC output voltage Vout. The D− pin 440 and the D+ pin 460 may be the identification pin ID as illustratively shown in FIG. 2 and FIG. 3 to receive the identification signal S_ID. Furthermore, the output terminal 400 further includes a device detecting pin 490. As illustratively shown in the figure, the device detecting pin 490 is electrically coupled to the ground pin 480, and configured to be shorted to ground with the ground pin when the electronic device is connected to the output terminal, so as to detect whether the electronic device is connected to the output terminal.

Alternatively stated, the wall socket 200 may be configured to determine when the electronic device is connected or disconnected to the output terminal 400 according to the corresponding signal of the device detecting pin 490. Thus, the load detecting circuit 240 may output corresponding control signal CS when the device detecting pin 490 detects the electronic device disconnected from the output terminal 400 (i.e., the electronic device is plugged out from the wall socket 200), such that the power converting circuit 200 is configured to stop outputting the DC output voltage Vout.

On the other hand, the load detecting circuit 240 may also output corresponding control signal CS when the device detecting pin 490 detects the electronic device connected to the output terminal 400 (i.e., the electronic device is plugged into the wall socket 200) to activate the driving circuit 260 and the power converting circuit 220, such that the power converting circuit 200 starts to output the DC output voltage Vout so as to supply power to the electronic device.

It is noted that though the output terminal 400 illustratively shown in FIG. 4A and FIG. 4B are USB 2.0 interface, the present disclosure is not limited thereto. The device detecting pin 490 may also be arranged in USB interface version 3.0 or above, and connected with the corresponding ground pin such that the wall socket is able to detect and determine whether the electronic device is connected.

Figure 5:
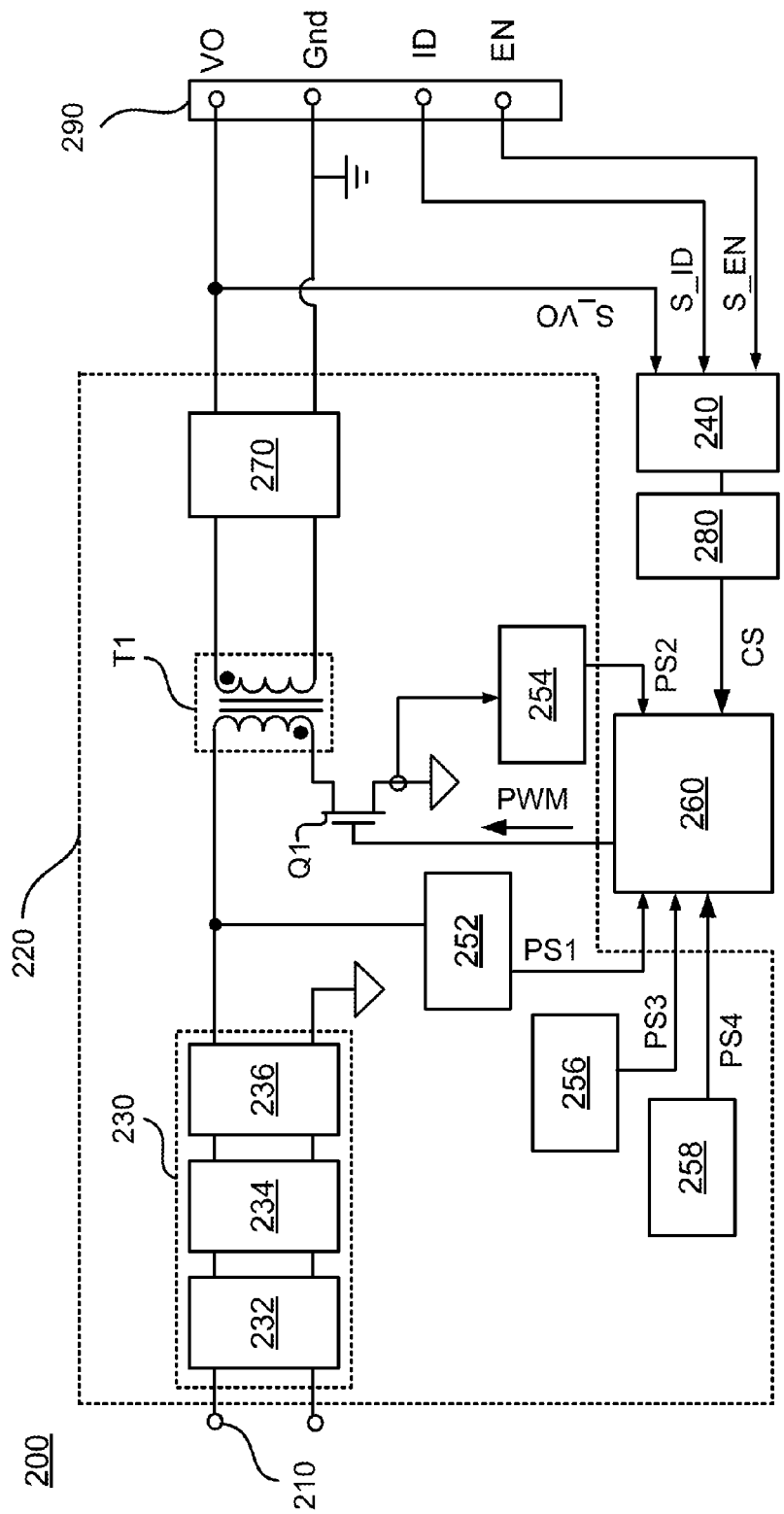
FIG. 5 is a circuit diagram illustrating the circuit of the wall socket according an embodiment of the present disclosure.

Reference is made to FIG. 5. FIG. 5 is a circuit diagram illustrating the circuit of the wall socket 200 according an embodiment of the present disclosure. The circuit of the wall socket 200 illustratively shown in FIG. 5 may operate in accompany with the output terminals 400 having mechanic devices as illustratively shown in FIG. 4A and FIG. 4B. Compared to the embodiments shown in FIG. 3, in the embodiments shown in FIG. 5, the output terminal 290 further includes device detecting pin EN. The load detecting circuit 240 is further configured to receive the device detecting signal S_EN from the device detecting pin EN. Thus, the load detecting circuit 240 may determine whether to activate or inactivate the driving circuit 260 and power converting circuit 220 according to the voltage level of the device detecting signal S_EN, and output corresponding control signal CS to the driving circuit 260 via the isolating circuit 280 so as to achieve the control.

It is noted that, as explained in the above paragraphs, in some embodiments, the activation or the termination of the operations of the power converting circuit 220 and the driving circuit 260 may also be controlled by the identification signal S_ID sent from the electronic device. Detecting whether the electronic device is connected by arranging device detecting pin 490 as the embodiment shown in FIG. 4A and FIG. 4B is only one example of the possible embodiments of the present disclosure and not meant to limit the present disclosures.

In summary, according to the various embodiments disclosed in the present disclosure, the wall socket in the present disclosure determines the voltage level required by the electronic device by receiving the identification signal outputted by the electronic device, and accordingly controls the operation of the power converting circuit. Thus, the wall socket may provide various power supply mode and adjust the output automatically to satisfy the power requirement of the electronic device.

In addition, in some embodiments, the wall socket of the present disclosure determines whether the electronic device is connected to the wall socket through the identification signal or the device detecting signal so as to determine the activation of the circuits, and thus lowering the power consumption during the standby state to achieve energy conservation.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wall socket, comprising:
   a socket housing;
   an input terminal, wherein the input terminal of the wall socket is configured to receive an input voltage from a power grid;
   an output terminal arranged at a side of the socket housing and configured to output a dc output voltage;
   a power converting circuit arranged in the socket housing and configured to convert the input voltage to the dc output voltage according to a control signal; and
   a load detecting circuit configured to receive an identification signal outputted by an electronic device when the electronic device is connected to the output terminal, and output the control signal according to the identification signal to adjust a voltage level of the dc output voltage of the output terminal, in order to configure the dc output voltage of the output terminal to be the voltage level corresponding to the identification signal selected from a plurality of different voltage levels;
   wherein the voltage level of the dc output voltage outputted by the same output pin of the ouput terminal of the wall socket varies according to the identification signal.

2. The wall socket of claim 1, further comprising:
   a driving circuit configured to receive the control signal, and output a driving signal according to the control signal,
   wherein the power converting circuit is configured to receive the driving signal and convert the input voltage to the dc output voltage according to the driving signal.

3. The wall socket of claim 2, wherein the driving signal is a pulse width modulation signal.

4. The wall socket of claim 2, further comprising:
   an isolating circuit electrically coupled between the load detecting circuit and the driving circuit,
   wherein the load detecting circuit is configured to output the control signal to the driving circuit via the isolating circuit.

5. The wall socket of claim 2, wherein the power converting circuit comprises:
   a transformer comprising a primary side and a secondary side, wherein the secondary side is configured to output the dc output voltage; and
   a switch electrically coupled to the primary side and the driving circuit, configured to be turned on or off selectively according to the driving signal such that the voltage level of the dc output voltage outputted by the transformer corresponds to the driving signal.

6. The wall socket of claim 5, wherein the power converting circuit further comprises:
a rectifier and filter circuit electrically coupled to the primary side and configured to convert the input voltage to a rectified voltage signal,
wherein the primary side is configured to receive the rectified voltage signal.

7. The wall socket of claim 1, wherein the load detecting circuit is further configured to output the control signal, according to a shutdown signal, such that the power converting circuit is configured to stop supplying power to the electronic device when the electronic device outputs the shutdown signal.

8. The wall socket of claim 1, wherein the output terminal comprises:
an output pin configured to output the dc output voltage;
a ground pin; and
an identification pin configured to receive the identification signal.

9. The wall socket of claim 8, wherein the output terminal further comprises:
a device detecting pin electrically coupled to the ground pin and configured to be shorted to ground with the ground pin when the electronic device is connected to the output terminal, so as to detect whether the electronic device is connected to the output terminal.

10. The wall socket of claim 9, wherein the load detecting circuit is configured to output the control signal when the device detecting pin detects the electronic device disconnected to the output terminal, such that the power converting circuit is configured to stop outputting the dc output voltage.

11. The wall socket of claim 1, wherein the output terminal is a universal serial bus interface.

12. The wall socket of claim 1, wherein the load detecting circuit is configured to output the control signal to adjust the voltage level of the dc output voltage to be a value between 0 volts to 50 volts.

13. A wall socket, comprising:
an input terminal, wherein the input terminal of the wall socket is configured to receive an input voltage from a power grid;
an output terminal;
a rectifier and filter circuit electrically coupled to the input terminal and configured to convert the input voltage to a rectified voltage signal;
a transformer comprising a primary side electrically coupled to the rectifier and filter circuit, and a secondary side electrically coupled to the output terminal and configured to output a dc output voltage according to the rectified voltage signal;
a load detecting circuit electrically coupled to the output terminal, configured to receive an identification signal outputted by an electronic device when the electronic device is connected to the output terminal, and output a control signal according to the identification signal;
a driving circuit electrically coupled to the load detecting circuit, configured to receive the control signal and output a driving signal according to the control signal; and
a switch electrically coupled to the primary side of the transformer and the driving circuit, configured to be turned on or off selectively according to the driving signal such that the voltage level of the dc output voltage of the output terminal outputted by the transformer corresponds to the driving signal, in order to configure the dc output voltage of teh output terminal to be the voltage level corresponding to the identification signal selected from a plurality of different voltage levels;
wherein the voltage level of the dc output voltage outputted by the same output pin of the output terminal of the wall socket varies according to the identification signal.

14. The wall socket of claim 13, wherein the load detecting circuit is further configured to output the control signal, according to a shutdown signal, such that the transformer is configured to stop outputting the dc output voltage when the electronic device outputs the shutdown signal.

15. The wall socket of claim 13, wherein the output terminal comprises:
an output pin configured to output the dc output voltage;
a ground pin; and
an identification pin configured to receive the identification signal.

16. The wall socket of claim 15, wherein the output terminal further comprises:
a device detecting pin electrically coupled to the ground pin, and configured to be shorted to ground with the ground pin when the electronic device is connected to the output terminal, so as to detect whether the electronic device is connected to the output terminal.

17. The wall socket of claim 16, wherein the load detecting circuit is configured to output the control signal when the device detecting pin detects the electronic device disconnected to the output terminal, such that the power converting circuit is configured to stop outputting the dc output voltage.

18. The wall socket of claim 13, further comprising:
an isolating circuit electrically coupled between the load detecting circuit and the driving circuit,
wherein the load detecting circuit is configured to output the control signal to the driving circuit via the isolating circuit.

19. The wall socket of claim 13, wherein the output terminal is a universal serial bus interface.

20. The wall socket of claim 13, wherein the load detecting circuit is configured to output the control signal to adjust the voltage level of the dc output voltage to be a value between 0 volts to 50 volts.

* * * * *